M. J. DWYER.
AUTOMOBILE DIRECTION SIGNAL.
APPLICATION FILED MAR. 20, 1920.
1,371,743. Patented Mar. 15, 1921.
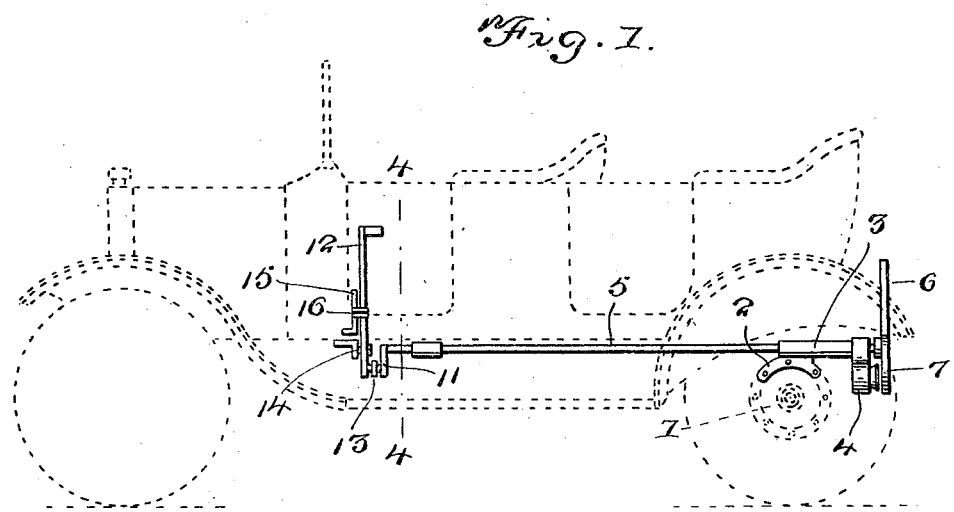
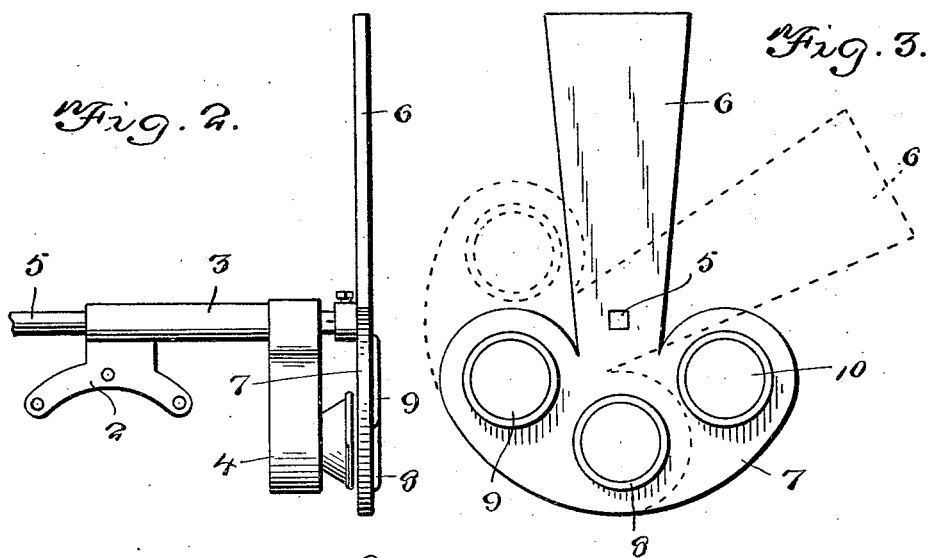
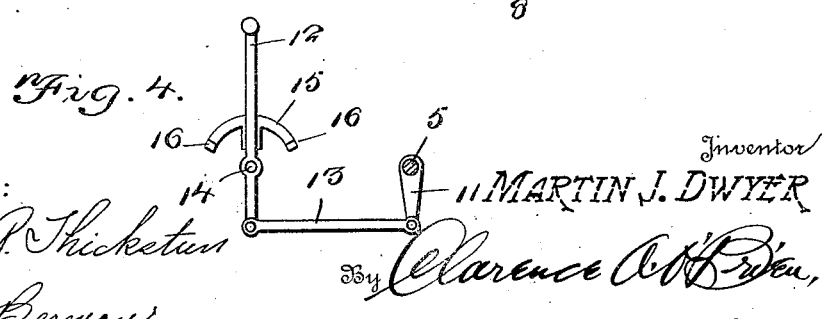
Witnesses:
William P. Thicketum
Hyman Berman
Inventor
MARTIN J. DWYER
By Clarence A. O'Brien,
Attorney

UNITED STATES PATENT OFFICE.

MARTIN J. DWYER, OF STURGIS, MICHIGAN.

AUTOMOBILE DIRECTION-SIGNAL.

1,371,743. Specification of Letters Patent. Patented Mar. 15, 1921.

Application filed March 20, 1920. Serial No. 367,484.

*To all whom it may concern:*

Be it known that I, MARTIN J. DWYER, a citizen of the United States, residing at Sturgis, in the county of St. Joseph and State of Michigan, have invented new and useful Improvements in Automobile Direction-Signals, of which the following is a specification.

The object of my present invention is the provision of a simple and efficient signal, designed to be used at the rear end of an automobile with a view to enabling the driver thereof to convey an adequate understanding of his direction intentions to a following driver and in that way lessen the liability of accident.

To the attainment of the foregoing the invention consists in the improvement as hereinafter described and definitely claimed.

In the accompanying drawings, hereby made a part hereof:

Figure 1 is a view showing my novel signal in side elevation as properly arranged on an automobile, the latter being shown in dotted lines.

Fig. 2 is an enlarged detail side elevation of the rear portion of the improvement.

Fig. 3 is a rear elevation of the same.

Fig. 4 is a detail transverse section taken in the plane indicated by the line 4—4 of Fig. 1, looking forwardly.

Similar numerals of reference designate corresponding parts in all of the views of the drawings.

In accordance with my invention I fix to the rear axle casing 1 of an automobile a bracket 2 at the underside of a longitudinal-central horizontally-arranged tube 3, and on the rear portion of the said tube 3 I arrange a pendent lamp casing 4, containing an incandescent electric or other lamp, and provided, by preference. with a white lens (not shown).

Journaled in the tube 3 is a rock-shaft 5. disposed longitudinally of the automobile, and fixed on the rear end of said shaft 5 is a transversely-swinging semaphore arm 6 which may be and preferably is highly colored. At the opposite side of its center of movement, with reference to its major portion, the said arm 6 is provided with an arcuate head 7, characterized essentially by three glazed openings 8, 9 and 10; the glass of the central opening 8 being of a red color while the glass of the opening 9 is preferably of a green color and that of the opening 10 of a blue color. From this it follows that with the opening 8 in registration with the lens of the lamp 4 and the semaphore arm 6 in upright position the signal will indicate continued forward movement in a straight path while when the semaphore arm is swung toward the left and the opening 9 is alined with the lens of the lamp 4 a turn toward the left will be indicated. Swinging of the arm 6 toward the right and the placing of the opening 10 in registration with the lens of lamp 4 will indicate a turn toward the right.

I extend the mechanism 5 by continuing the rock shaft forwardly to a point under the foot board of the automobile. Here the shaft 5 is provided with a crank 11, Figs. 1 and 4, and between the said crank 11 and the lower arm of a hand lever 12 a link rod 13 is interposed. The lever 12 is fulcrumed at 14, and its upper arm is opposed to a fixed segmental member 15 with stops 16 at its ends; the said stops being designed by cooperation with the lever 12 to limit the deflections of the arm 6 from the vertical and thereby assure registration of the opening 9 or the opening 10 with the lens of lamp 4, according to the direction in which the lever is moved. Manifestly when the lever 12 is upright and midway between the stops 16, the semaphore arm 6 will stand upright and the opening 8 will rest in registration with the lamp lens.

Having described my invention, what I claim and desire to secure by Letters Patent, is:—

An automobile having a longitudinal, horizontal tube with a bracket at its underside fixed to the rear axle casing of the automobile, a lamp casing pendent on the rear portion of the tube and having a lens directed toward the rear, a longitudinal horizontal rock shaft journaled in said tube and having a crank disposed under the automobile foot board, a semaphore arm fixed on the rear end of the rock shaft and having an arcuate head movable transversely in rear of the lamp lens and also having three varicolored glazed openings in an arcuate series in said head for alternate registration with said lens, a transversely-swinging lever fulcrumed at an intermediate point in its length on the forward portion of the automobile and having its lower arm connected with the crank of the rock shaft, and a segmental member fixed to the automobile in opposed relation to the upper arm of the lever and having stops at its ends.

In testimony whereof, I hereunto affix my signature.

MARTIN J. DWYER.